(12) United States Patent
Hartwell

(10) Patent No.: US 9,176,314 B1
(45) Date of Patent: Nov. 3, 2015

(54) AUTOMATIC INTENSITY CONTROL FOR LIGHT SETTING SYSTEM FOR COVERT OPERATION

(75) Inventor: Mark Alan Hartwell, Tulalip, WA (US)

(73) Assignee: The Boeing Company, Chicago, IL (US)

( * ) Notice: Subject to any disclaimer, the term of this patent is extended or adjusted under 35 U.S.C. 154(b) by 695 days.

(21) Appl. No.: 13/475,986

(22) Filed: May 20, 2012

(51) Int. Cl.
*G01J 1/32* (2006.01)
*H05B 37/02* (2006.01)
*G02B 23/12* (2006.01)
*A42B 3/04* (2006.01)
*B60Q 1/14* (2006.01)

(52) U.S. Cl.
CPC . *G02B 23/12* (2013.01); *A42B 3/04* (2013.01); *B60Q 1/14* (2013.01)

(58) Field of Classification Search
CPC ............... A42B 1/00; A42B 1/24; A42B 3/00; A42B 3/003; A42B 3/04; A42B 3/0406; A42B 3/042; A42B 3/0433; A42B 3/046; A42B 3/18; A42B 3/20; A42B 3/22; A42B 3/228; G02B 23/12; G02B 23/125; B60Q 1/00; B60Q 1/02; B60Q 1/14; B60Q 1/1407; B60Q 1/1415; B60Q 1/1438
USPC ......... 2/455, 422, 424, 15, 426–454, 6.1–6.8; 250/214 VT, 205, 214 AL, 214 R, 214.1; 313/523, 524; 315/76, 77, 82
See application file for complete search history.

(56) References Cited

U.S. PATENT DOCUMENTS

| 4,755,725 A * | 7/1988 | Kastendieck et al. ........ 315/360 |
| 5,331,459 A * | 7/1994 | Dor .............................. 359/409 |
| 2008/0007826 A1 * | 1/2008 | Smith et al. ................... 359/407 |

OTHER PUBLICATIONS

"Lighting, Aircraft,Night Vision Imaging System (NVIS) Compatible", MIL-STD-3009; Feb. 2, 2001.
"Lighting, Aircraft Exterior, Night Vision Imaging System (NVIS) Compatible", SAE ARP4392; Issued Jun. 1993, reaffirmed Jun. 2002.
"Design Requirements and Test Procedures for Dual Mode Exterior Lights", SAE ARP5825; Issued Jul. 2005.
"Night Vision Goggles (NVG) Compatible Lighting for Civil Aircraft", SAE AS5452 Revision A; Issued Apr. 2000, Revised Jun. 2006.

* cited by examiner

*Primary Examiner* — Pascal M Bui Pho
(74) *Attorney, Agent, or Firm* — McDonnell Boehnen Hulbert & Berghoff LLP

(57) ABSTRACT

A system and methods for automatically setting light intensity for covert operations are presented. Infra-red light is transmitted from at least one infra-red light source, and external ambient light is sensed substantially continually from at least one ambient light sensor coupled to a vehicle exterior to provide sensed ambient light. A sensed intensity of the sensed ambient light is compared to a sensitivity of a night vision goggles to provide a power adjustment value. An intensity level of the at least one infra-red light is controlled based on the power adjustment value such that the external ambient light is provided at a substantially optimal light level for the night vision goggles.

17 Claims, 5 Drawing Sheets

AUTOMATIC INTENSITY CONTROL FOR LIGHT SETTING SYSTEM FOR COVERT OPERATION

FIELD

Embodiments of the present disclosure relate generally to sensors. More particularly, embodiments of the present disclosure relate to optical infra-red sensors.

BACKGROUND

Some aircraft comprise infrared (IR) landing lights suitable for detection of a runway during short approach, but may be too bright when the aircraft is taxiing. Excessive IR brightness can cause a night vision goggles (NVGs) to activate automatic gain control, which may lead to loss of pilot situational awareness.

SUMMARY

A system and methods for automatically setting light intensity for covert operations is presented. At least one infra-red light is transmitted from at least one infra-red light source, and external ambient light is sensed substantially continually from a plurality of ambient light sensors coupled to a vehicle exterior to provide sensed ambient light. A sensed intensity of the sensed ambient light in conjunction with filtering effects of a windshield is compared to a sensitivity of a night vision goggles (NVGs) to provide a power adjustment value. An intensity level of the infra-red light is controlled based on the power adjustment value taking into account a filter adjustment factor/value of filtering effects of the windshield such that the external ambient light is provided at a substantially optimal light level for the night vision goggles.

In this manner, embodiments of the disclosure allow uniform and consistent IR lighting automatically. Embodiments provide system and methods that reduce user/pilot work load during important stages of operation/flight such as takeoff and landing. Consistent IR images that do not cause the NVGs to "bloom" due to excessive supplied IR energy are provided. The consistent IR images provide a uniform view without a need to adjust supplied light sources providing an optimal working system.

In an embodiment, an automatic intensity light setting system for covert operation comprises at least one infra-red light source, at least one ambient light sensor, and a covert light controller. The infra-red light source is coupled to a vehicle exterior of a vehicle and transmits infra-red light upon activation. The ambient light sensor is coupled to the vehicle exterior and substantially continually senses external ambient light in response to the activation of the infra-red light source to provide sensed ambient light. The covert light controller compares an intensity of the sensed ambient light to a sensitivity of a night vision goggles to provide a power adjustment value. The covert light controller further controls an intensity level of the infra-red light based on the power adjustment value such that the external ambient light is provided at a substantially optimal light level for the night vision goggles.

In another embodiment, a method for automatically setting light intensity for covert operation transmits at least one infra-red light from at least one infra-red light source. The method further substantially continually senses external ambient light from at least one ambient light sensor coupled to a vehicle exterior in response to an activation of the infra-red light source to provide sensed ambient light. The method further compares a sensed intensity of the sensed ambient light to a sensitivity of a night vision goggles to provide a power adjustment value. The method further controls an intensity level of the infra-red light based on the power adjustment value such that the external ambient light is provided at a substantially optimal light level for the night vision goggles.

In a further embodiment, a computer readable storage medium comprises computer-executable instructions for operating an automatic intensity light setting system for covert operation. The computer-executable instructions transmit at least one infra-red light from at least one infra-red light source. The computer-executable instructions further substantially continually sense external ambient light from at least one ambient light sensor coupled to a vehicle exterior in response to an activation of the infra-red light source to provide sensed ambient light. The computer-executable instructions further compares a sensed intensity of the sensed ambient light to a sensitivity of a night vision goggles to provide a power adjustment value. The method further controls an intensity level of the infra-red light based on the power adjustment value such that the external ambient light is provided at a substantially optimal light level for the night vision goggles.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to signal processing, optical sensors, electronic circuits, electronic devices, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a non-limiting application, namely, aircraft external light intensity setting for covet operation. Embodiments of the disclosure, however, are not limited to such aircraft external light intensity setting applications, and the techniques described herein may also be utilized in other applications. For example but without limitation, embodiments may be applicable to bicycles, automobiles, submarines, or other ground, air, and water vehicles that can be operated by an operator/user wearing night visions goggles. Embodiments may also be applicable to portable devices carried by a user to automatically set light intensity for covet operation.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
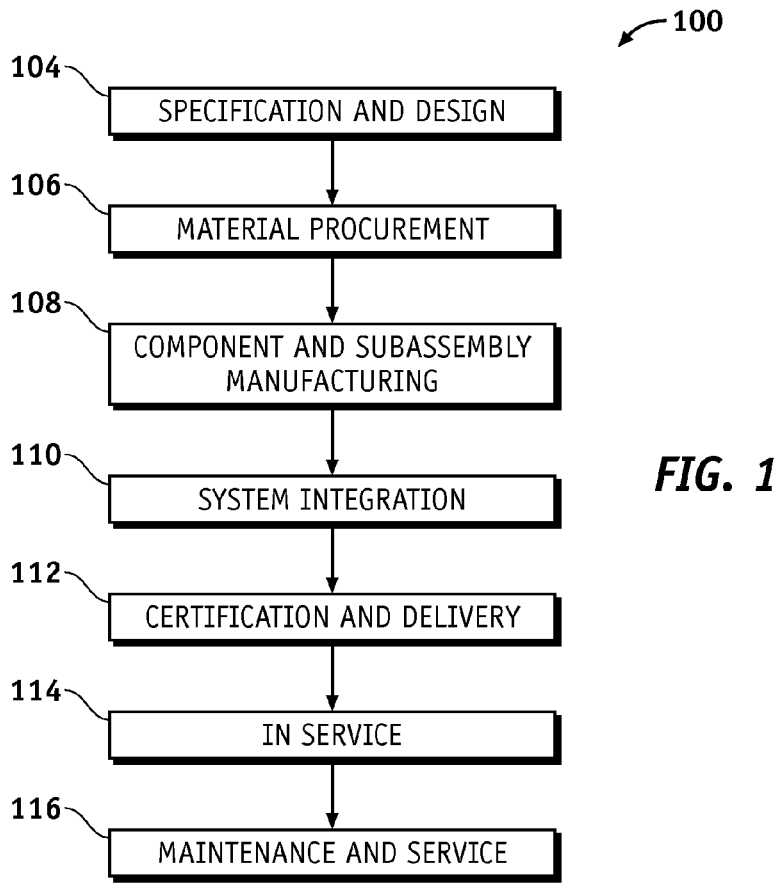
FIG. 1 is an illustration of a flow diagram of an exemplary aircraft production and service methodology.
Figure 2:
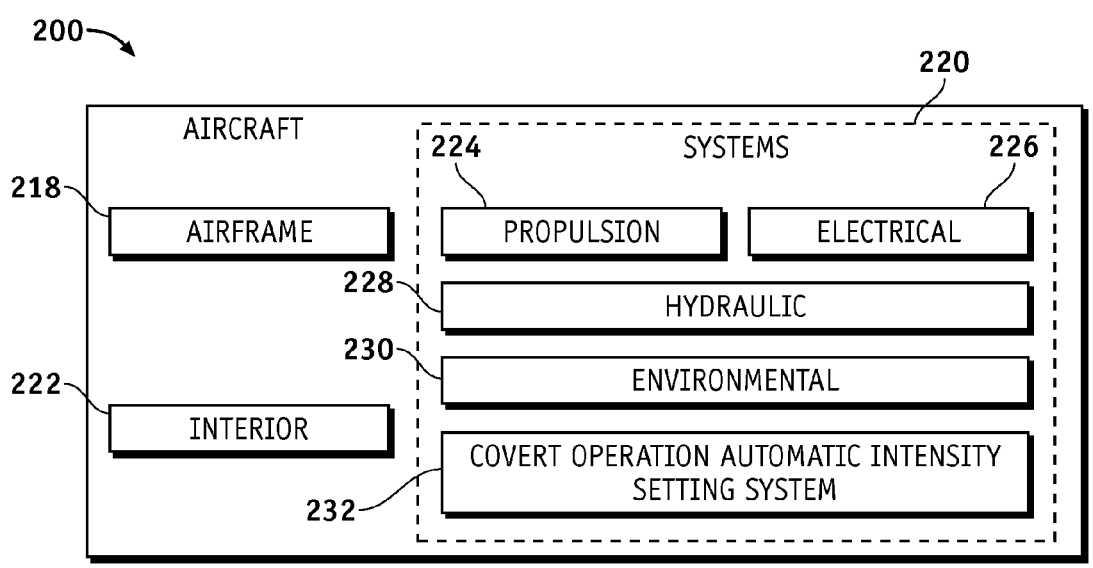
FIG. 2 is an illustration of an exemplary block diagram of an aircraft.

Referring more particularly to the drawings, embodiments of the disclosure may be described in the context of an aircraft manufacturing and service method 100 (method 100) as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220, and an interior 222. Examples of high-level systems 220 include one or more of a propulsion system 224, an electrical system 226, a hydraulic system 228, an environmental system 230, and a covert operation automatic intensity setting system 232. Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Embodiments of the disclosure provide a system and methods that can be used during covert operations using a covert lighting system in conjunction with night vision goggles (NVGs). For example, the embodiments can be used during aircraft takeoff and landing using a covert lighting system in conjunction with standard military night vision goggles (NVGs). Typical light sources for covert operations are generally restricted to an infra-red (IR) region of an electromagnetic spectrum. NVGs are sensitive to IR energy and allow a user to operate during low light operations such as covert operations.

Too much IR energy can cause the NVGs to activate an automatic gain control and cause an overexposed view. The overexposed view can result in a loss of pilot/user situational awareness, which is a non-optimal condition that can cause excessive pilot/user work load during important stages of a flight or other operation. Embodiments provide multiple IR light sensors that can provide automatic control for IR lighting intensity used during an operation such as aircraft take-off and landing.

A covert mode (IR mode) for exterior lighting may be defined as not viewable by a dark-adapted, unaided eye at a distance greater than 30 feet, in a dark environment (e.g., less than about 10.8 lux (less than about 1.0 foot-candle) ambient illumination), and when a night vision imaging systems (NVIS) is on the ground. The covert mode should generally be viewable by an NVIS such as an NVG at a substantially minimum distance of about 5.6 kilometers (about 3 NM) in the air, at night, with a three-quarter to full moon, and with all other system exterior lights off. A "lower hemisphere" is generally defined as not viewable by an NVIS equipped ground or aerial observer when the NVIS is directly overhead, straight and level, and at about 91 m (about 300 feet) to about 152 m (about 500 feet) away.

Figure 3:
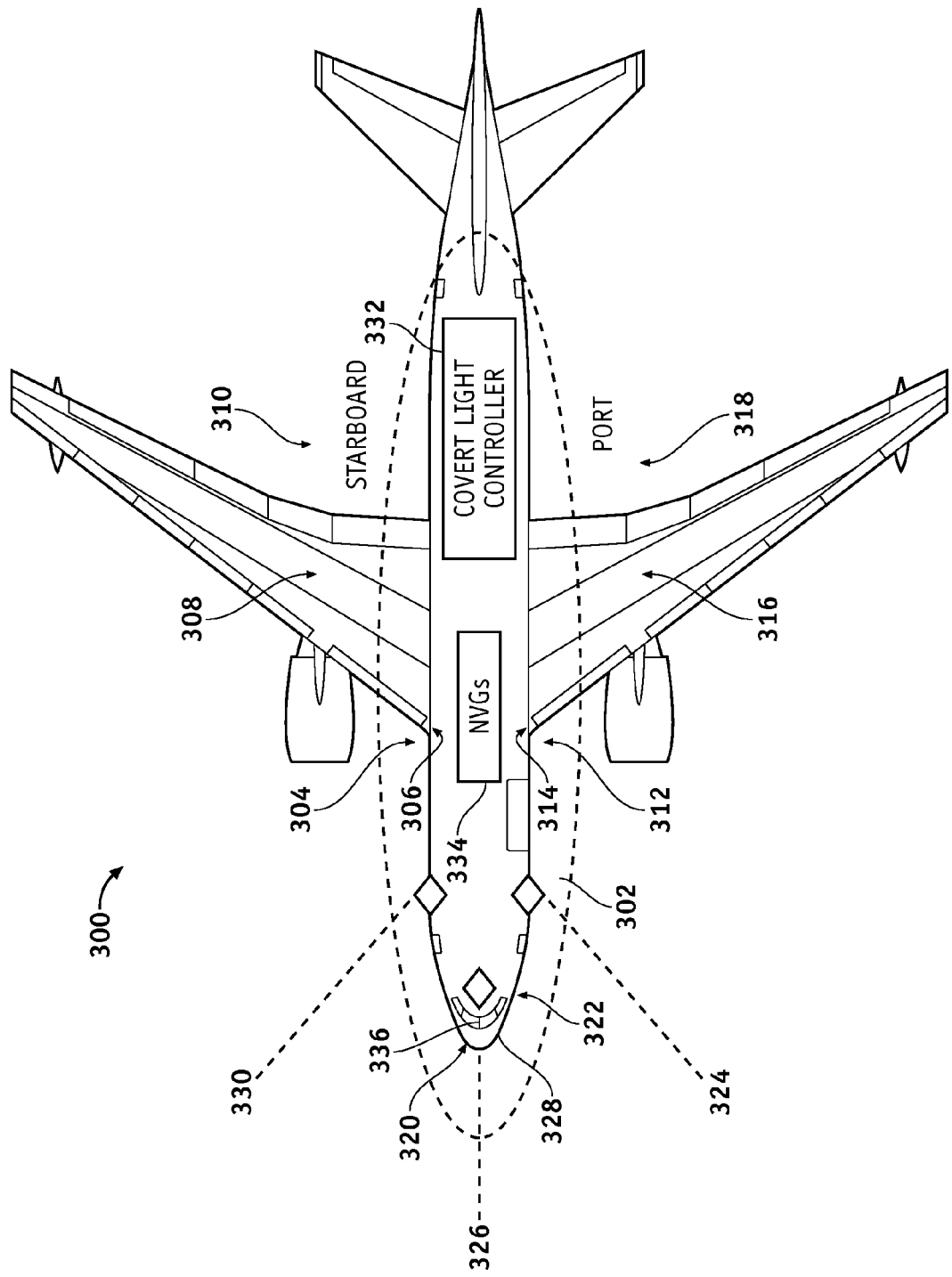
FIG. 3 is an illustration of an exemplary aircraft comprising an automatic light intensity setting system for covert operation according to an embodiment of the disclosure.

FIG. 3 is an illustration of an exemplary aircraft 300 comprising an automatic intensity light setting system 302 (system 302) for covert operation according to an embodiment of the disclosure. The system 302 is configured to adjust a total available infra-red energy surrounding the aircraft 300 to a substantially same light level range (scale) as a light level operation range of a night vision goggles 334 (NVGs) that may be used by a pilot/user. The automatic intensity light setting system 302 may comprise covert infra-red light sources 304/312/322/320, ambient light sensors 502 (FIG. 5), and a covert light controller 332.

The covert infra-red light sources 304/312/322/320 may comprise: a single covert starboard runway turnoff light source 304 (covert infra-red light source 304) located at a wing root 306 of a starboard wing 308 on a starboard side 310;

a single covert port runway turnoff light source 312 (covert infra-red light source 312) located at a wing root 314 of a port wing 316 on a port side 318; dual covert landing light source 320 (covert infra-red light source 320) mounted on a landing gear (not shown); and a single covert taxi light source 322 (covert infra-red light source 322) mounted on the nose landing gear and operable to steer therewith. The covert infra-red light sources 304/312/322/320 may comprise, for example but without limitation, incandescent light sources, light emitting diodes sources, or other type of infra-red light sources capable of providing IR light.

Figure 4:
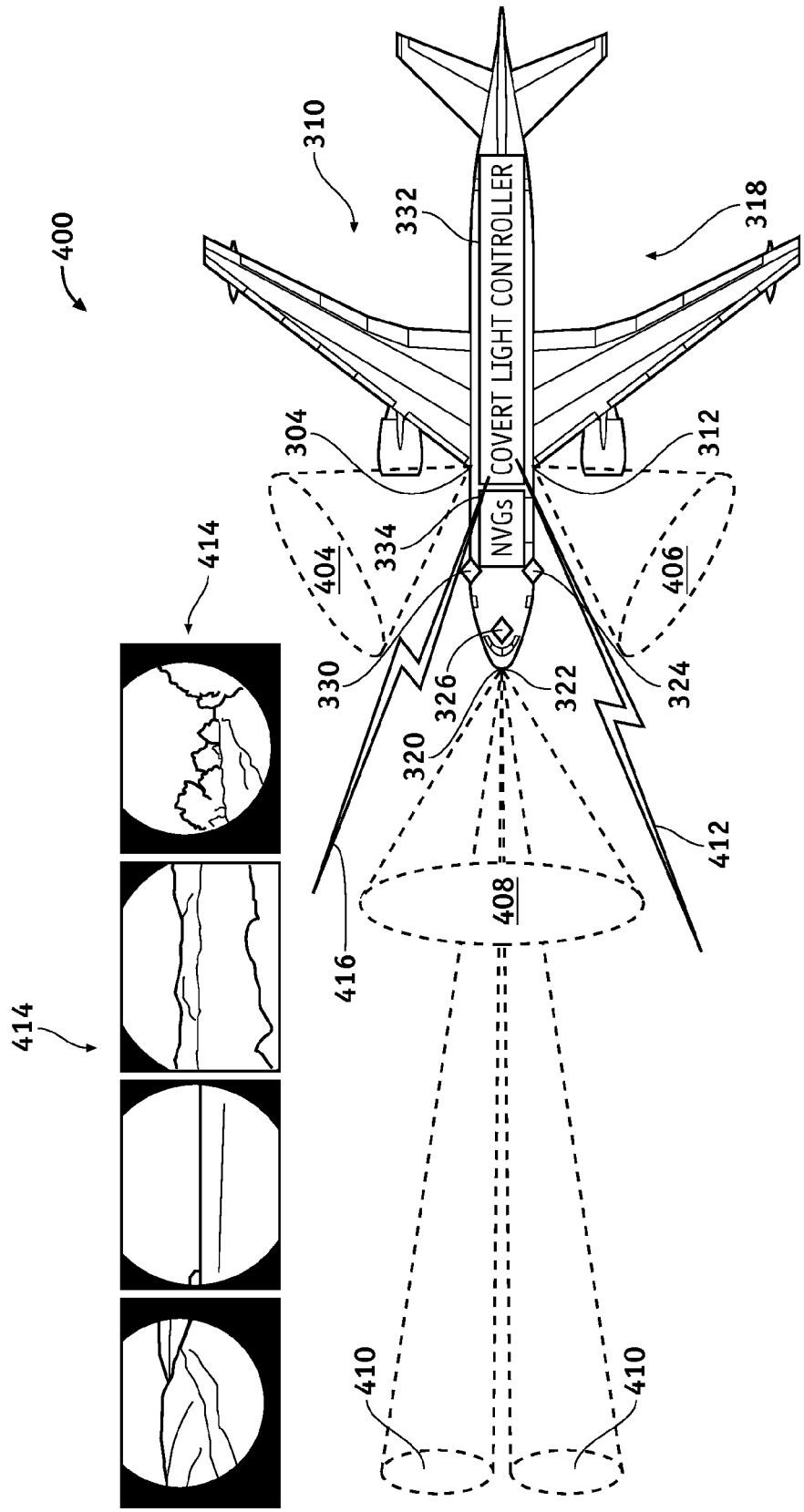
FIG. 4 is an illustration of an exemplary operating environment showing infra-red light sources of an aircraft in an activated mode transmitting infra-red light according to an embodiment of the disclosure.

Each of the covert infra-red light sources 304/312/322/320 is operable to transmit a covert infra-red light energy output 404/406/408/410 (light 404/406/408/410) respectively upon activation as shown in FIG. 4 below. The covert infra-red light source 304 transmits the covert infra-red light energy output 404. The covert infra-red light source 312 transmits the covert infra-red light energy output 406. The covert infra-red light source 322 transmits the covert infra-red light energy output 408. The covert infra-red light source 320 transmits the covert infra-red light energy output 410.

In this document, covert infra-red light source, infra-red light source, and light source, may be used interchangeably. Similarly, covert infra-red light energy output, covert infra-red light, infra-red light energy output, light energy output, infra-red light, and light may be used interchangeably.

The ambient light sensors 502 (FIG. 5) may comprise an ambient port light sensor 324 (S1 324) operable to sense light transmitted forward and outboard of the port wing 316, an ambient forward light sensor 326 (S2 326) operable to sense light transmitted forward of the aircraft nose 328, and an ambient starboard light sensor 330 (S3 330) operable to sense light transmitted forward and outboard of the starboard wing 308. By aiming the ambient sensors S1 324/S2 326/S3 330 in this manner (e.g., one sensor is aimed forward, one sensor is aimed forward and outboard of a left buttock line (LBL) and the third photo sensor is aimed forward and outboard of a right buttock line (RBL)) either or both of the single covert starboard runway turnoff light source 304 and the single covert port runway turnoff light source 312 can be independently controlled and not affect power output of the dual covert landing light source 320 (landing light source 320) and the single covert taxi light source 322 (taxi light source 322).

Each of the ambient sensors S1 324, S2 326, and S3 330 comprise infra-red photo sensors that use a same sensing technology used in the NVGs 334. In this manner, a total available infra-red energy 412 (FIG. 4) transmitted from the covert infra-red light sources 304/312/320/322 can be adjusted to a same scale as the NVGs 334 as explained in more detail in the context of discussion of FIG. 5 below.

Ambient light sensed by the ambient sensors S1 324, S2 326, and S3 330 may comprise, for example but without limitation, natural light such as starlight, moonlight, and auroras, artificial light such as automotive light, street lights, and building light, sky glow (natural and/or artificial), or other ambient light that may be available in an environment.

The covert light controller 332 is configured to receive a sensed intensity of sensed ambient light from the ambient sensors S1 324, S2 326, and S3 330, and compare the sensed intensity to a sensitivity of the NVGs 334 to provide a power adjustment value. The covert light controller 332 generates a dimming command to control an intensity level of covert infra-red light energy outputs 404/406/408/410 (FIG. 4) transmitted from the covert infra-red light sources 304/312/322/320 respectively such that a uniform contrast vision in all fields of view is provided to a user via the NVGs 334.

In one embodiment, the NVGs 334 may be separated from ambient light by a windshield 336 which acts as a filter to the NVGs 334. In this case, the covert light controller 332 is configured to provide the power adjustment value by taking into account a filtering effect of the windshield 336 as explained in more detail below. The windshield 336 may comprise, for example but without limitation, a window, a canopy, or other transparent surface.

FIG. 4 is an illustration of an exemplary operating environment 400 showing the infra-red light sources 304/312/320/322 of the aircraft 300 in an activated mode transmitting covert infra-red light energy output 404, 406, 410 and 408 respectively. The operating environment 400 may have functions, material, and structures that are similar to the embodiments shown in FIG. 3. Therefore, common features, functions, and elements may not be redundantly described here.

The covert infra-red light energy output 404, 406, 410 and 408 are generally filtered so they are not visible to a naked eye beyond approximately 6 to 9 meters (approximately 20 to 30 feet). Such IR lights may be intended to provide illumination so that a night vision imaging systems (NVIS) such as the NVGs 334 can provide an acceptable image without adequate natural/ambient light. In operation, the single covert starboard runway turnoff light source 304 transmits a covert runway turnoff light energy output 404, the single covert port runway turnoff light source 312 transmits a covert runway turnoff light energy output 406, the dual covert landing light source 320 transmits covert landing light energy output 410, and the single covert taxi light source 322 transmits a covert taxi light energy output 408.

As explained above, each of the ambient sensors S1 324, S2 326, and S3 330 uses a same sensing technology used in the NVGs 334. In this manner, the total available infra-red energy 412/416 transmitted by the covert runway turnoff light energy output 404, the covert runway turnoff light energy output 406, the covert landing light energy output 410 and the covert taxi light energy output 408 transmitted from the covert infra-red light sources 304/312/320/322 respectively can be adjusted by the covert light controller 332 to a same scale (operational light range) as the NVGs 334. Furthermore, the total available infra-red energy 412/416 may be adjusted by the covert light controller 332 to a same scale (operational light range) as the NVGs 334 while compensating for filtering effects of the windshield 336. Furthermore, the total available infra-red energy 412/416 may be adjusted by the covert light controller 332 to a same scale (operational light range) as the NVGs 334 such that a pilot/user has a uniform contrast vision in all fields of view 414 through the NVGs 334 as explained in more detail in the context of discussion of FIG. 5 below.

Figure 5:
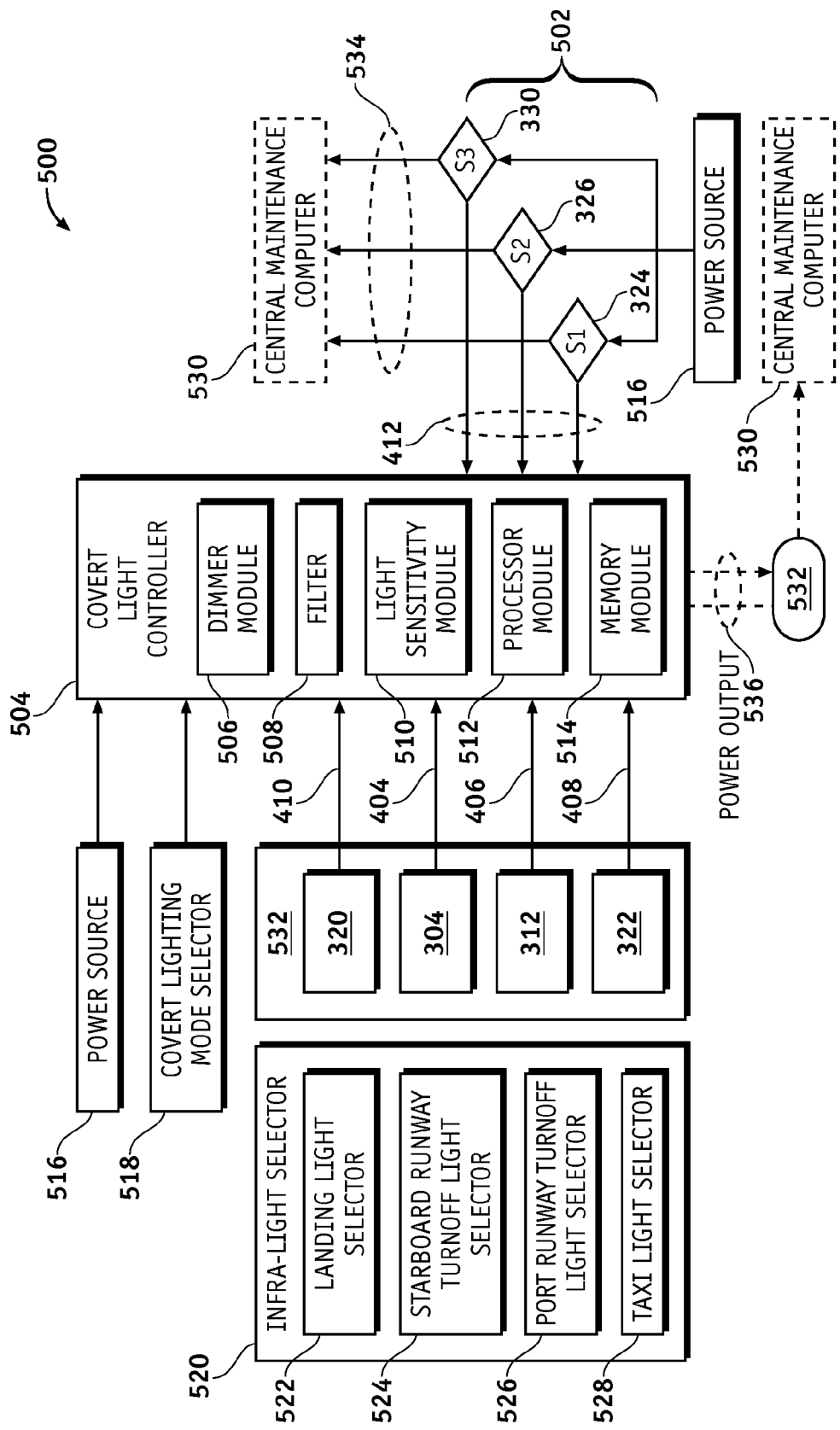
FIG. 5 is an illustration of an exemplary block diagram of an automatic intensity light setting system for covert operation according to an embodiment of the disclosure.

FIG. 5 is an illustration of an exemplary block diagram of an automatic intensity light setting system 500 (302 in FIG. 3) for covert operation according to an embodiment of the disclosure. The system 500 is configured to adjust the total available infra-red energy 412/416 (FIG. 4) transmitted by the covert infra-red light energy output 404, 406, 408 and 410 from the covert infra-red light sources 304, 312, 322, and 320 respectively to a same scale as the NVGs 334 such that the pilot/user can have a uniform contrast vision in all fields of view through the NVGs 334 (FIG. 3).

The system 500 may have functions, material, and structures that are similar to the system 302 and operating environment 400. Therefore common features, functions, and elements may not be redundantly described here. The system 500 comprises ambient light sensors 502, a covert light controller 504, a power source 516, a covert lighting mode selector 518, a light selector 520, and covert infra-red light sources 532. In some embodiments, the system 500 may comprise any number of processor modules, any number of memory modules, and any number of ambient sensors, any number of power sources and any number of covert light controllers. The illustrated system 500 depicts a simple embodiment for ease of description. These and other elements of the system 500 are interconnected together, allowing communication between the various elements of system 500.

The ambient light sensors 502 comprise the ambient port light sensor 324 (S1 324) configured to sense light transmitted forward and outboard of the port wing 316, the ambient forward light sensor 326 (S2 326) configured to sense light transmitted forward of the aircraft nose 328, and the ambient starboard light sensor 330 (S3 330) configured to sense light transmitted forward and outboard of the starboard wing 308. Each of the ambient sensors S1 324, S2 326, and S3 330 comprise infra-red photo sensors that use a substantially same sensing technology used in the NVGs 334. In this manner, the total available infra-red energy 412/416 transmitted from the covert infra-red lights 304/312/320/322 can be adjusted by the covert light controller 504 to a same scale (operational light range) as the NVGs 334. The adjustment may comprise corrections for the aircraft 300 windshield 336 which acts like a filter (508 in FIG. 5) to the NVGs 334.

The system 500 may also comprise a central maintenance computer 530 to monitor health of the ambient light sensors 502 by receiving data from the ambient light sensors 502 through data lines 534.

The covert infra-red light sources 532 comprise the covert infra-red light sources 304/312/320/322 as explained above. Each of the covert infra-red light sources 532 can be activated/selected by a pilot/user using, for example but without limitation, an activation switch, or other activation method. Activation of each of the covert infra-red light sources 532 activates a corresponding ambient sensor among the ambient light sensors 502. For example, activation of the dual covert landing light source 320 and/or the single covert taxi light source 322 activates the ambient forward light sensor 326 (S2 326), activation of the single covert port runway turnoff light source 312 activates the ambient port light sensor 324 (S1 324), and activation of the single covert starboard runway turnoff light source 304 activates the ambient starboard light sensor 330 (S3 330).

The covert light controller 504 comprises a dimmer module 506, a filter 508, a light sensitivity module 510, a processor module 512, and a memory module 514. In operation, the covert light controller 504 receives the sensed intensity of the ambient light from the ambient light sensors 502, and compares the intensity of the sensed ambient light to a sensitivity of the NVGs 334 (FIG. 3) to provide a power adjustment value. The covert light controller 504 then generates a dimming command comprising a power output 536 to control intensity level of the infra-red lights 532 based on the power adjustment value such that an optimal light level is provided to the night vision goggles.

The dimmer module 506 may interface with the ambient light sensors 502 and each of the covert infra-red light sources 532. In this manner, individual covert infra-red lights 532 are not affected. The dimmer module 506 is configured to generate the dimming command comprising the power output 536 to control an intensity level of the infra-red light sources 532 based on the power adjustment value such that the optimal light level is provided to the NVGs 334.

The dimming command may be generated at, for example but without limitation, a refresh rate of 100 milliseconds to 110 milliseconds, or other refresh rate. The refresh rate range may change based on a type of the covert infra-red light sources 532 providing IR light. For example, if incandescent light sources (lamps) are used as the covert infra-red light sources 532 and filtered to emit IR, then voltage regulation may be used to generate the dimming command. However, if LEDs are used as the covert infra-red light sources 532, then the dimming command may be generated by pulse width modulation (PWM). In this case, a frequency of PWM should be selected so as to prevent phasing with the NVGs 334 refresh rates such that blinking or pulsing of the fields of view 414 (IR image) is avoided.

Some benefits of the system 500 comprise: 1) Reduced user/pilot work load during important stages of operation/flight and 2) Consistent IR images such as the fields of view 414 that do not cause the NVGs 334 to "bloom" and hence provides for an optimal working system. Generally when wearing NVGs, much of peripheral vision may be lost. However, if the NVGs are driven into automatic gain control, additional peripheral vision may be lost. By using the system 500 according to the embodiments, pilots/users can maintain their available peripheral vision and have a consistent level of illumination regardless of their selectable lighting choices and natural ambient conditions.

The filter 508 is configured to account for a filtering effect of the windshield 336 of a vehicle such as the aircraft 300. The filter 508 accounts for the filtering effect of the windshield 336 of the aircraft 300 by providing a filter adjustment value. Each vehicle/aircraft type may have a specific type of the filter 508 depending on structure and/or components of the windshield 336. The filter 508 is configured to generate a variable affect, depending on an electromagnetic spectrum of a light source such as, without limitation, the covert infra-red light sources 532 natural ambient light, or other light source. IR has quite a wide range. For example, light emitting diodes (LEDs) can produce very narrow wavelengths, whereas filtered incandescent light from an incandescent light source (lamp) can produce wavelengths significantly broader than the LEDs. Thus, the filter adjustment value accounts for a type of the covert infra-red light sources 532 and individual aspects of the windshield 336. In some embodiments, filtering may only be applied to wavelengths of light to which the NVGs 334 are designed to multiply.

The light sensitivity module 510 is configured to compare intensity of the sensed ambient light sensed by the ambient light sensors 502 to a sensitivity of the NVGs 334 to provide the power adjustment value to the (supplied) covert infra-red light sources 532. In one embodiment, the light sensitivity module 510 continuously generates the power adjustment value based on an integration of sensed ambient light (e.g., collection of sensed ambient light) of each of the ambient light sensors 502. In one embodiment, the light sensitivity module 510 provides the power adjustment value by also taking into account the filtering effect of the windshield 336 provided by the filter adjustment value of the filter 508. The light sensitivity module 510 may comprise downloadable software comprising a same light sensitivity scale used in the NVGs 334.

The covert lighting mode selector 518 is configured to select a covert lighting mode for all of the covert infra-red light sources 304/312/320/322. The covert infra-red light sources 304/312/320/322 can operate in non-covert mode if the covert lighting mode is not selected.

The light selector 520 comprises a landing light selector 522, a starboard (R) runway turnoff light selector 524, a port (L) runway turnoff light selector 526, and a taxi light selector 528. The light selector 520 is configured to allow a user/pilot to select at least one covert infra-red light source among the covert infra-red light sources 304/312/320/322 if the covert lighting mode is selected. In this manner, the system 500 not only compensates for a variety of ambient light but also compensates for a variety of pilot selectable conditions. For example, during a covert taxi and takeoff, a flight crew selects the covert lighting mode from the covert lighting mode selector 518 and may further select: 1) the dual covert landing light source 320 alone via the landing light selector 522, or 2) the dual covert landing light source 320 via the landing light selector 522 and the single covert taxi light source 322 via the taxi light selector 528, or 3) the dual covert landing light source 320 via the landing light selector 522 and a single covert runway turnoff light 304/314 via the runway turnoff light selector 524/526, or 4) the dual covert landing light source 320 via the landing light selector 522, the single covert taxi light source 322 via the taxi light selector 528, and the single covert runway turnoff light source 304/314 via the runway turnoff light selector 524/526.

Any selection the flight crew/operator may choose, the ambient light sensors 502 collect all available infra-red energy 412/416 and the covert light controller 504 automatically adjust the infra-red (IR) output of the covert infra-red light sources 304/312/320/322 to provide a uniform and consistent IR energy level such that the flight crew/operator has an optimal and substantially sufficient view (414 in FIG. 4) to perform a task such as takeoff and taxi. During short approach landing, the dual covert landing light source 320 can be continuously and automatically adjusted depending on variable natural ambient light.

The power source 516 is configured to supply power to the system 500 and adjust power output 536 of the covert infra-red lights 532 based on the power adjustment value.

The processor module 512 is configured to support an automatic intensity light setting method as described herein. For example but without limitation, the processor module 512 may be suitably configured to send the power adjustment value to the dimmer module 506, direct the filter 508 to provide the filter adjustment value, direct the light sensitivity module 510 to provide the power adjustment value based on a comparison of the intensity of the sensed ambient light with the sensitivity of the NVGs 334 and further based on the filter adjustment value, or other function of the system 500. Furthermore, the steps of a method or algorithm described in connection with the embodiments disclosed herein may be embodied directly in hardware, in firmware, in a software module executed by processor module 512, or in any practical combination thereof.

The processor module 512 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices comprising hardware and/or software, e.g., a combination of a digital signal processor and a microprocessor, a plurality of microprocessors, one or more microprocessors in conjunction with a digital signal processor core, or any other such configuration.

The memory module 514 may comprise a data storage area with memory formatted to support the operation of the system 500. The memory module 514 is configured to store, maintain, and provide data as needed to support the functionality of the system 500. For example but without limitation, the memory module 514 may store flight configuration data, sensitivity of the NVGs 334, type of the filter 508, or other data.

In some embodiments, the memory module 514 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 514 may be coupled to the processor module 512 and configured to store, for example but without limitation, a database, a computer program that is executed by the processor module 512, an operating system, an application program, tentative data used in executing a program, or other application. Additionally, the memory module 514 may represent a dynamically updating database containing a table for updating the database, and the like.

The memory module 514 may be coupled to the processor module 512 such that the processor module 512 can read information from and write information to the memory module 514. For example, the processor module 512 may access the memory module 514 to access the sensitivity of the NVGs 334, type of the filter 508, or other data.

As an example, the processor module 512 and memory module 514 may reside in respective application specific integrated circuits (ASICs) or other programmable devices. The memory module 514 may also be integrated into the processor module 512. In an embodiment, the memory module 514 may comprise a cache memory for storing temporary variables or other intermediate information during execution of instructions to be executed by the processor module 512.

Figure 6:
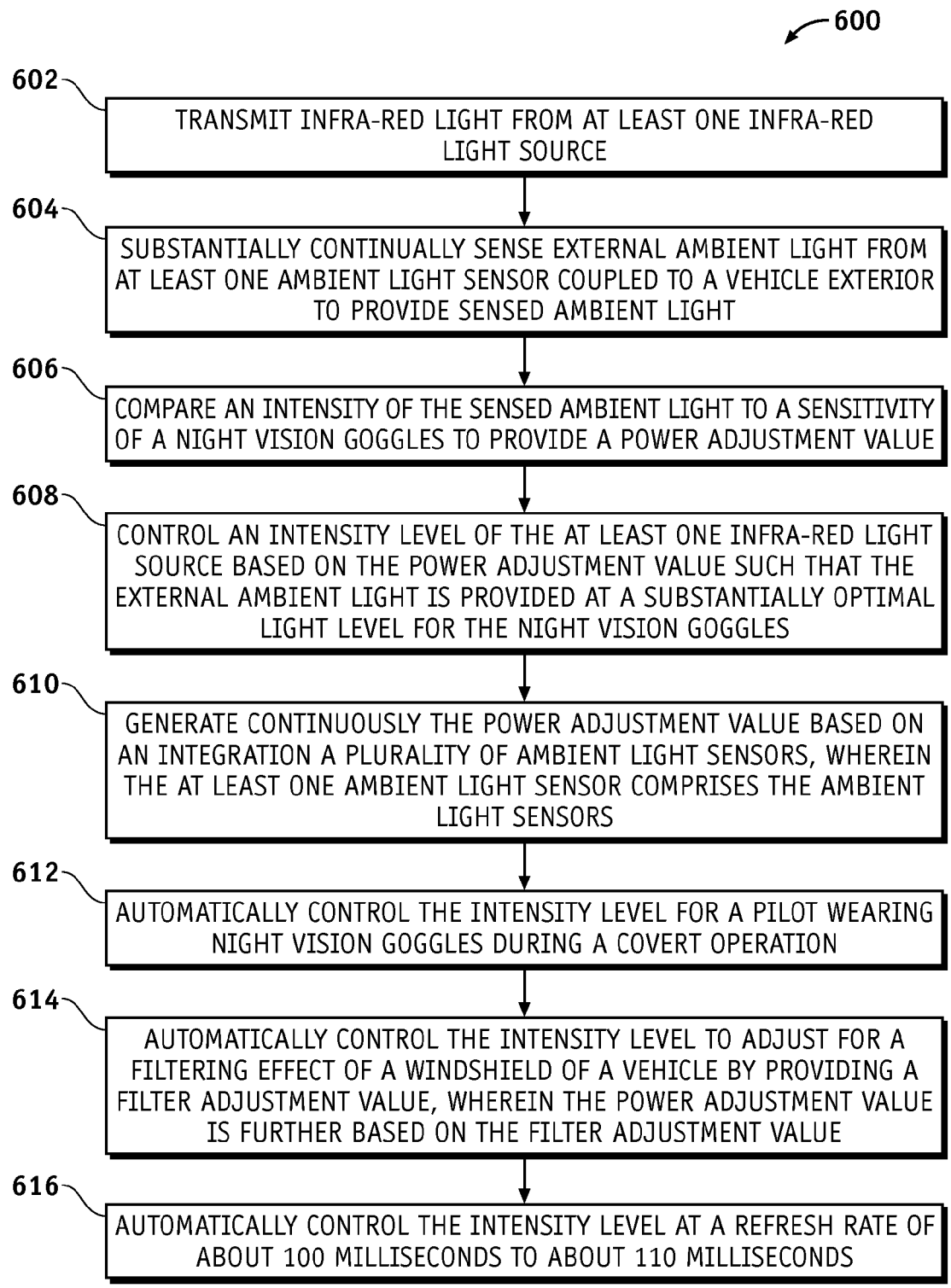
FIG. 6 is an illustration of an exemplary flowchart showing a process for automatically setting light intensity for covert operation according to an embodiment of the disclosure.

FIG. 6 is an illustration of an exemplary flowchart showing a process for automatically setting light intensity for covert operation according to an embodiment of the disclosure. The various tasks performed in connection with process 600 may be performed mechanically, by software, hardware, firmware, computer-readable software, computer readable storage medium, or any combination thereof. It should be appreciated that process 600 may include any number of additional or alternative tasks, the tasks shown in FIG. 6 need not be performed in the illustrated order, and the process 600 may be incorporated into a more comprehensive procedure or process having additional functionality not described in detail herein.

For illustrative purposes, the following description of process 600 may refer to elements mentioned above in connection with FIGS. 1-5. In some embodiments, portions of the process 600 may be performed by different elements of the systems 302 and 500 such as: the covert infra-red light sources 532, the ambient light sensors 502, the covert light controller 504, the power source 516, the covert lighting mode selector 518, the light selector 520, etc. It should be appreciated that process 600 may include any number of additional or alternative tasks, the tasks shown in FIG. 6 need not be performed in the illustrated order, and the process 600 may be incorporated into a more comprehensive procedure or process having additional functionality not described in detail herein.

Process 600 may begin by transmitting at least one infra-red light such as the covert infra-red light energy output 404/406/408/410 from at least one infra-red light source such as the covert infra-red light sources 304/312/322/320 (task 602).

Process 600 may continue by substantially continually sensing external ambient light from at least one ambient light sensor coupled to the vehicle exterior to provide sensed ambient light (task 604). The substantially continually sensing of external ambient light from at least one ambient light sensor S1 324/S2 326/S3 330 coupled to the vehicle exterior to provide sensed ambient light, may be in response to an activation of at least one infra-red light source 304/312/322/320 to provide sensed ambient light.

Process 600 may continue by comparing an intensity of the sensed ambient light to a sensitivity of a night vision goggles such as the NVGs 334 to provide a power adjustment value (task 606). The sensitivity of night vision goggles may comprise, for example but without limitation, a range of light intensity measurable by the night vision goggles, a response to received light intensity in a spectral range of the night vision goggles, or other sensitivity of night vision goggles. Furthermore, the sensitivity of night vision goggles may comprise, for example but without limitation, a sensitivity for a particular type of night vision goggles, a sensitivity for several types of night vision goggles, a calculated sensitivity of general night vision goggles, a heuristic for sensitivity of general night vision goggles, or other sensitivity of night vision goggles.

Process 600 may continue by controlling an intensity level of the at least one infra-red light based on the power adjustment value such that the external ambient light is provided at a substantially optimal light level for the night vision goggles (task 608). The intensity level of the at least one infra-red light may be selected to accommodate an operation condition such as, without limitation, taxi, takeoff, landing, or other operation of an aircraft. The substantially optimal light level for the night vision goggles may comprise, for example but without limitation, a light level that minimizes saturation of the night vision goggles, light level that enhances viewing of a runway through the night vision goggles, or other optimal light level for the night vision goggles. Furthermore, the substantially optimal light level for the night vision goggles may comprise, for example but without limitation, a substantially optimal light level for a particular type of night vision goggles, a substantially optimal light level for several types of night vision goggles, a calculated substantially optimal light level of general night vision goggles, a heuristic for substantially optimal light level of general night vision goggles, or other substantially optimal light level of night vision goggles.

Process 600 may continue by generating continuously the power adjustment value based on an integration of the sensed ambient light of a plurality of ambient light sensors such as the ambient light sensors S1 324, S2 326, and S3 330, wherein the at least one ambient light sensor comprises the ambient light sensors (task 610).

Process 600 may continue by automatically controlling the intensity level of the at least one infra-red light available for a pilot wearing night vision goggles during a covert operation (task 612). The night vision goggles worn by the pilot may be of a same type as used to provide the substantially optimal light and/or the sensitivity of night vision goggles, or a type with sufficiently similar night vision operational characteristics to the same type.

Process 600 may continue by automatically controlling the intensity level to adjust for a filtering effect of a windshield of a vehicle by providing a filter adjustment value, where the power adjustment value is further based on the filter adjustment value (task 614).

Process 600 may continue by automatically controlling the intensity level at a refresh rate of about 100 milliseconds to about 110 milliseconds (task 616).

In this manner, embodiments of the disclosure allow uniform and consistent IR lighting automatically. Some benefits of the system 500 comprise: 1) Reduced user/pilot work load during important stages of operation/flight such as takeoff and landing and 2) Consistent IR images such as the fields of view 414 that do not cause the NVGs 334 to "bloom" due to excessive supplied IR energy. Consistently have a uniform view without a need to adjust the supplied light sources provides for an optimal working system.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-5 depicts example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 512 to cause the processor module 512 to perform specified operations. Such instructions, generally referred to as "computer program code" or "program code" (which may be grouped in the form of computer programs or other groupings), when executed, enable the systems 302 and 500.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. An automatic intensity light setting system for covert operation, the system comprising:
    at least one infra-red light source coupled to a vehicle exterior of a vehicle and operable to transmit infra-red light in response to an activation;
    at least one ambient light sensor coupled to the vehicle exterior and operable to substantially continually sense external ambient light in response to the activation to provide sensed ambient light; and
    a covert light controller operable to:
        compare an intensity of the sensed ambient light to a sensitivity of night vision goggles to provide a power adjustment value;
        control an intensity level of the at least one infra-red light source based on the power adjustment value such that the external ambient light is provided at a substantially optimal light level for the night vision googles;
    wherein the cover light controller comprises a light sensitivity module operable to compare the intensity of the sensed ambient light to the sensitivity of the night vision goggles to provide the power adjustment value and a filter operable to account for a filtering effect of a windshield of the vehicle by providing a filter adjustment value, wherein the power adjustment value is further based on the filter adjustment value.

2. The system of claim 1, wherein the covert light controller comprises a dimmer module operable to generate a dimming command based on the power adjustment value to control the intensity level of the at least one infra-red light source.

3. The system of claim 2, wherein the vehicle is an aircraft and the dimmer module is further operable to allow selecting the intensity level of the at least one infra-red light source to accommodate at least one operation condition selected from the group consisting of: taxi, takeoff, and landing.

4. The system of claim 2, wherein the dimming command is generated at a refresh rate of about 100 milliseconds to about 110 milliseconds.

5. The system of claim 1, wherein:
    the at least one ambient light sensor comprises a plurality of ambient light sensors;
    the at least one infra-red light source comprises a plurality of infra-red light sources; and
    the covert light controller is further operable to:
    integrate the sensed ambient light from all the ambient light sensors; and
    automatically and substantially continuously adjust a power output to the infra-red light sources that are activated.

6. The system of claim 5, wherein the vehicle is an aircraft and the ambient light sensors comprise:
    an ambient port light sensor operable to be activated in response to activating a port runway turnoff light source from among the infra-red light sources;
    an ambient forward light sensor operable to be activated in response to activating one of: a taxi light source and a landing light source, from among the infra-red light sources; and
    an ambient starboard light sensor operable to be activated in response to activating a starboard runway turnoff light source from among the infra-red light sources.

7. The system of claim 6, wherein:
    the ambient port light sensor is operable to sense light transmitted forward and outboard of a port wing;
    the ambient forward light sensor is operable to sense light transmitted forward of an aircraft nose; and
    the ambient starboard light sensor is operable to sense light transmitted forward and outboard of a starboard wing,
    such that at least one of: the port runway turnoff light source and the starboard runway turnoff light source is independently controlled and does not affect a power output of the landing light source and the taxi light source.

8. The system of claim 1, wherein the optimal light level provides a user with a uniform contrast vision in all fields of view.

9. A method for automatically setting light intensity for a covert operation, the method comprising:
    transmitting infra-red light from at least one infra-red light source;
    substantially continually sensing external ambient light from at least one ambient light sensor coupled to a vehicle exterior to provide sensed ambient light in response to an activation of the at least one infra-red light source;
    comparing an intensity of the sensed ambient light to a sensitivity of a night vision goggles to provide a power adjustment value;
    controlling an intensity level of the at least one infra-red light source based on the power adjustment value such that the external ambient light is provided at a substantially optimal light level for the night vision goggles, wherein the intensity level of the at least one infra-red light source is selected to accommodate at least one operation condition selected from the group consisting of: taxi, takeoff, and landing of an aircraft; and
    automatically controlling the intensity level to adjust for a filtering effect of a windshield of the aircraft by providing a filter adjustment value, wherein the power adjustment value is further based on the filter adjustment value.

10. The method of claim 9, further comprising generating continuously the power adjustment value based on an integration of sensed ambient light of each of a plurality of ambient light sensors, wherein the at least one ambient light sensor comprises the ambient light sensors.

11. The method of claim 9, further comprising automatically controlling the intensity level for a pilot wearing the night vision goggles during the covert operation.

12. The method of claim 9, further comprising automatically controlling the intensity level at a refresh rate of about 100 milliseconds to about 110 milliseconds.

13. A non-transitory computer readable storage medium comprising computer-executable instructions for operating an automatic intensity light setting system for covert operation, the computer-executable instructions comprising:
    transmitting infra-red light from at least one infra-red light source;
    substantially continually sensing external ambient light from at least one ambient light sensor coupled to a vehicle exterior in response to an activation of the at least one infra-red light source to provide sensed ambient light;
    comparing a sensed intensity of the sensed ambient light to a sensitivity of night vision goggles to provide a power adjustment value;
    controlling an intensity level of the at least one infra-red light source based on the power adjustment value such that the external ambient light is provided at a substantially optimal light level for the night vision goggles; and
automatically controlling the intensity level to adjust for a filtering effect of a windshield of the vehicle by providing a filter adjustment value, wherein the power adjustment value is further based on the filter adjustment value.

14. The non-transitory computer readable storage medium of claim 13, wherein the vehicle is an aircraft and the intensity level of the at least one infra-red light source is selected to accommodate at least one operation condition selected from the group consisting of: taxi, takeoff, and landing of the aircraft.

15. The non-transitory computer readable storage medium of claim 14, further comprising automatically controlling the intensity level for a pilot wearing the night vision goggles during the covert operation.

16. An automatic intensity light setting system for covert operation, the system comprising:
  a plurality of infra-red light sources coupled to a vehicle exterior of an aircraft and operable to transmit infra-red light in response to an activation;
  a plurality of ambient light sensors coupled to the vehicle exterior and operable to substantially continually sense external ambient light in response to the activation to provide sensed ambient light, wherein the ambient light sensors comprise:
    an ambient port light sensor operable to be activated in response to activating a port runway turnoff light source from among the infra-red light sources;
    an ambient forward light sensor operable to be activated in response to activating one of: a taxi light source and a landing light source, from among the infra-red light sources; and
    an ambient starboard light sensor operable to be activated in response to activating a starboard runway turnoff light source from among the infra-red light sources; and
  a covert light controller operable to:
    compare an intensity of the sensed ambient light to a sensitivity of a night vision goggles to provide a power adjustment value;
    control an intensity level of at least one of the plurality of infra-red light sources based on the power adjustment value such that the external ambient light is provided at a substantially optimal light level for the night vision goggles;
    integrate the sensed ambient light from all the ambient light sensors; and
    automatically and substantially continuously adjust a power output to the infra-red light sources that are activated.

17. The system of claim 16, wherein:
the ambient port light sensor is operable to sense light transmitted forward and outboard of a port wing;
the ambient forward light sensor is operable to sense light transmitted forward of an aircraft nose; and
the ambient starboard light sensor is operable to sense light transmitted forward and outboard of a starboard wing,
such that at least one of: the port runway turnoff light source and the starboard runway turnoff light source is independently controlled and does not affect a power output of the landing light source and the taxi light source.

\* \* \* \* \*